UNITED STATES PATENT OFFICE.

EDGAR ARTHUR ASHCROFT, OF LONDON, ENGLAND.

MANUFACTURE OF ANHYDROUS MAGNESIUM CHLORID.

1,231,471.  Specification of Letters Patent.  Patented June 26, 1917.

No Drawing.  Application filed December 5, 1916. Serial No. 135,241.

*To all whom it may concern:*

Be it known that I, EDGAR ARTHUR ASH-CROFT, a subject of the King of Great Britain, residing at 65 London Wall, in the city of London, England, and Plumley, Bovey Tracey, in the county of Devon, England, have invented new and useful Improvements in the Manufacture of Anhydrous Magnesium Chlorid, of which the following is a specification.

According to my invention, anhydrous magnesium chlorid is prepared by passing chlorin gas into a converter, or vessel, (which I will refer to as the converter) and feeding thereto magnesium oxid (or magnesium carbonate) either alone, or, preferably, in admixture with another substance whereby double decomposition, and reactions, of a more, or less, strongly exothermic character are brought about.

The magnesium oxid which I employ as raw material may be obtained from any suitable source. It may be for example, ground, and lightly burned, magnesite. Dry chlorin gas from any suitable source may be used. The converter employed may conveniently consist of an outer casing of iron with a lining, or bosh, of hard burned magnesite bricks and blocks carefully fitted and joined by magnesia cement mortar and the interior may be conical with the smallest dimension at bottom, the chlorin inlet, suitably protected, being led to this point. A tapping hole and spout for the fused chlorid may be provided at a short distance above the bottom so that when the converter is tapped it is not completely emptied but retains a small portion of the hot charge to constitute the fused medium for starting the next blow, or the converter may be tipped for discharging.

The normal temperature of working will lie between 700° and 900° centigrade, according to the precise reactions being carried on. The sum of all the reactions must be exothermic and the temperature can be regulated by the rate at which the chlorin gas is supplied and the simultaneous feed of the magnesium compound effected. The volatile products may pass away through a vent to a condenser, or be disposed of, or treated, in other desired way.

If magnesium oxid alone be thus treated in the converter with chlorin gas the possible reaction is

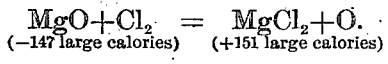
(−147 large calories)   (+151 large calories)

which shows only a small balance of heat set free by the reaction and this renders it somewhat difficult to successfully conduct the converter operation, for which self heating is practically indispensable.

I therefore prefer to use, in conjunction with the raw material, or materials, employed, another substance which, by its reactions with chlorin gas, or with the oxygen of the magnesia, or with both, will add materially to the total heat disengaged and thus I succeed in rendering the aforesaid process more readily available and very economical and practical. I instance, as suitable for this purpose, a sulfid of any metal provided that the resulting mixed chlorids can be easily separated, or can be used together for the object for which the magnesium chlorid is to be employed. Native galena, or clean zinc blende, are good examples of suitable substances for the purpose.

For example, I take molecular proportions of magnesite and clean galena (or zinc blende) and, having mixed, or ground, them together, I feed them into the fused charge in the converter and pass in dry chlorin gas when the following reaction takes place.

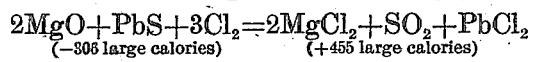
(−306 large calories)   (+455 large calories)

It will be seen that this reaction is strongly exothermic. If the supply of chlorin be pressed harder, and particularly if the temperature of working be not much above say 700° centigrade, the following reaction will take place:—

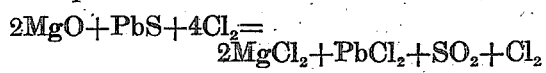

with a small further addition to the total heat liberated. The other metal sulfids act in an analogous manner.

The lead, (or zinc), may be precipitated from the resulting fused mixture of magnesium and lead, (or zinc), chlorid by adding magnesium scrap, sodium, or other precipitant, with a corresponding production of chlorid of the precipitating metal. Or fractional electrolysis may conveniently be employed to throw down the lead, or zinc. If alkali metal sulfid be employed the resulting chlorid remains in the melt. In either case the chlorid of magnesium is immediately useful for the production of magnesium by electrolysis of the fused anhydrous chlorid and the chlorin given off in that process may be returned to the converter for further use in my process. In this case a highly profitable recovery of both the lead (or zinc) and the sulfur of the galena (or blende) will result.

In place of sulfur I may use carbon in any suitable form to effect a similar result. For instance ground coke, or charcoal, lampblack, or the like, will give the following reaction:—

$$2MgO + C + 2Cl_2 = 2MgCl_2 + CO_2$$
(−286 large calories)  (+399 large calories).

Pure magnesuim chlorid remains.

In place of mixing carbon with the charge gases containing carbon may be blown in with the chlorin, or be supplied separately therefrom. Obviously, also, I may use both carbon and sulfur-bearing materials at the same time.

I do not confine my invention to the addition of the particular substances aforesaid, nor indeed to using any admixture at all with the magnesium oxid, or carbonate, which I use as raw material, as it will be obvious that, when worked on a sufficiently large scale, the reaction with the oxid alone may be sufficiently self-heating to constitute the process a practical one although, on a small scale it may not be so. It will also be obvious that a great variety of substances may be mixed with the magnesium oxid and analogous exothermic reactions be produced. It will also be obvious that magnesium compounds containing oxygen, other than the oxid, or carbonate, or mixtures of any such compounds, may be used as raw material and treated in the same manner when the thermal reactions and the economic conditions are suitable.

To start the operation in the converter it is convenient to employ therein a small quantity of mixed potassium and sodium chlorids which may be heated to a bright red heat and poured into the previously heated converter to constitute the fused medium, subsequent operations being started without this addition by utilizing a residuum of the preceding hot charge as the fused medium.

I do not claim under this application the reaction between chlorin and magnesia *per se* as I am aware that that reaction, which is reversible thus $$MgO + Cl_2 \rightleftarrows MgCl_2 + O$$

was known to the early chemists and has since been studied by Harber and others with a view to determining the conditions of equilibrium and the manufacture of chlorin from magnesium chlorid, nor do I claim *per se* the assistance of that reaction by means of carbon.

In the following claims it is to be understood that the expression "oxygen-containing magnesium compound" includes the use, as raw material, of magnesium oxid, magnesium carbonate, or other magnesium compound containing oxygen, or mixtures of such compounds.

I claim as my invention:—

1. The manufacture of anhydrous magnesium chlorid by treating, with chlorin gas, an oxygen-containing magnesium compound in a fused medium, substantially as hereinbefore explained.

2. The manufacture of anhydrous magnesium chlorid by treating, with chlorin gas, an oxygen-containing magnesium compound in a fused medium, the heat of reaction serving to maintain the charge at the requisite temperature, substantially as hereinbefore explained.

3. The manufacture of anhydrous magnesium chlorid by treating, with chlorin gas, an oxygen-containing magnesium compound in a fused medium, and in the presence of a substance which promotes the exothermic nature of the reaction, substantially as hereinbefore explained.

4. The manufacture of anhydrous magnesium chlorid by treating, with chlorin gas, an oxygen-containing magnesium compound, in a fused medium, and in the presence of carbon to promote the exothermic nature of the reaction, substantially as hereinbefore explained.

In testimony whereof I have signed my name to this specification, in the presence of two subscribing witnesses.

EDGAR ARTHUR ASHCROFT.

Witnesses:
  GILBERT FLETCHER TYSON,
  ARTHUR VICTOR STONE.